(12) United States Patent
Trisnadi et al.

(10) Patent No.: US 7,227,687 B1
(45) Date of Patent: Jun. 5, 2007

(54) COMPLEX SPATIAL LIGHT MODULATOR

(75) Inventors: Jahja I. Trisnadi, Cupertino, CA (US);
Alexander P. Payne, Ben Lomond, CA (US); Clinton B. Carlisle, Palo Alto, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 169 days.

(21) Appl. No.: 11/165,399

(22) Filed: Jun. 22, 2005

Related U.S. Application Data

(60) Provisional application No. 60/582,753, filed on Jun. 25, 2004.

(51) Int. Cl.
G02B 27/46 (2006.01)
G02B 26/00 (2006.01)
G02F 1/01 (2006.01)

(52) U.S. Cl. .................. 359/559; 359/276; 359/279; 359/237; 359/238

(58) Field of Classification Search .............. 359/237, 359/238, 276, 278, 279, 559, 290–293, 298
See application file for complete search history.

(56) References Cited

U.S. PATENT DOCUMENTS 5,766,829 A 6/1998 Cathey, Jr. et al.
6,842,285 B2* 1/2005 Gluckstad .................. 359/559

* cited by examiner

Primary Examiner—Ricky Mack
Assistant Examiner—Jack Dinh
(74) Attorney, Agent, or Firm—Okamoto & Benedicto LLP

(57) ABSTRACT

One embodiment relates to a spatial light modulator (SLM) for modulating light incident thereon. The SLM includes a plurality of pixels, each pixel including a plurality of phase shift elements. The SLM also includes a transform filter adapted to control the imaging system to resolve each pixel but not each phase shift element in each pixel. The plurality of pixels are controlled to independently modulate phase and magnitude of light reflected therefrom. Other embodiments are also disclosed.

10 Claims, 13 Drawing Sheets

(a) (b)

(c) (d)

COMPLEX SPATIAL LIGHT MODULATOR

CROSS-REFERENCE TO RELATED APPLICATIONS

The present application claims the benefit of U.S. Provisional Patent Application No. 60/582,753, entitled "Complex spatial light modulator," and filed Jun. 25, 2004 by Jahja I. Trisnadi, Alexander P. Payne, and Clinton B. Carlisle. The disclosure of the aforementioned provisional patent application is hereby incorporated by reference.

The present application is related to commonly-assigned U.S. patent application Ser. No. 11/001,364, entitled "Two dimensional spatial light modulator," and filed Nov. 30, 2004 by Alexander P. Payne and Jahja I. Trisnadi. The disclosure of the aforementioned patent application is hereby incorporated by reference.

TECHNICAL FIELD

The present disclosure relates generally to spatial light modulators, and more particularly to spatial light modulators and to methods of operating the same.

BACKGROUND OF THE INVENTION

Spatial light modulators are arrays of one or more devices that can control or modulate an incident beam of light in a spatial pattern that corresponds to an electrical input to the devices. The incident light beam can be modulated in intensity, phase, polarization or direction. The majority of spatial light modulators are intensity modulators (often intensity modulation causes some phase modulation, but the phase modulation cannot be done independently to the intensity modulation). Some modulation can be accomplished through the use of Micro-ElectroMechanical System devices (or MEMS) that use electrical signals to move micromechanical structures to modulate light incident thereon.

SUMMARY OF THE INVENTION

One embodiment relates to a spatial light modulator (SLM) for modulating light incident thereon. The SLM includes a plurality of pixels, each pixel including a plurality of phase shift elements. The SLM also includes a transform filter adapted to control the imaging system to resolve light reflected from each pixel but not light reflected from each phase shift element in each pixel. The plurality of pixels are controlled to independently modulate phase and magnitude of light reflected therefrom.

Another embodiment relates to a method of modulating light incident on a spatial light modulator (SLM) having a substrate with an upper surface and a plurality of pixels, each pixel including a plurality of phase shift elements disposed above the upper surface of the substrate. Light is caused to impinge upon the plurality of phase shift elements, and the plurality of phase shift elements are moved relative to the upper surface of the substrate. Reflected light is filtered using a transform filter adapted to resolve each pixel but not individual phase shift elements in each pixel. The phase shift elements are controlled in such a way as to modulate phase independently from amplitude.

Another embodiment relates to

Other embodiments are also disclosed.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

Figure 1:
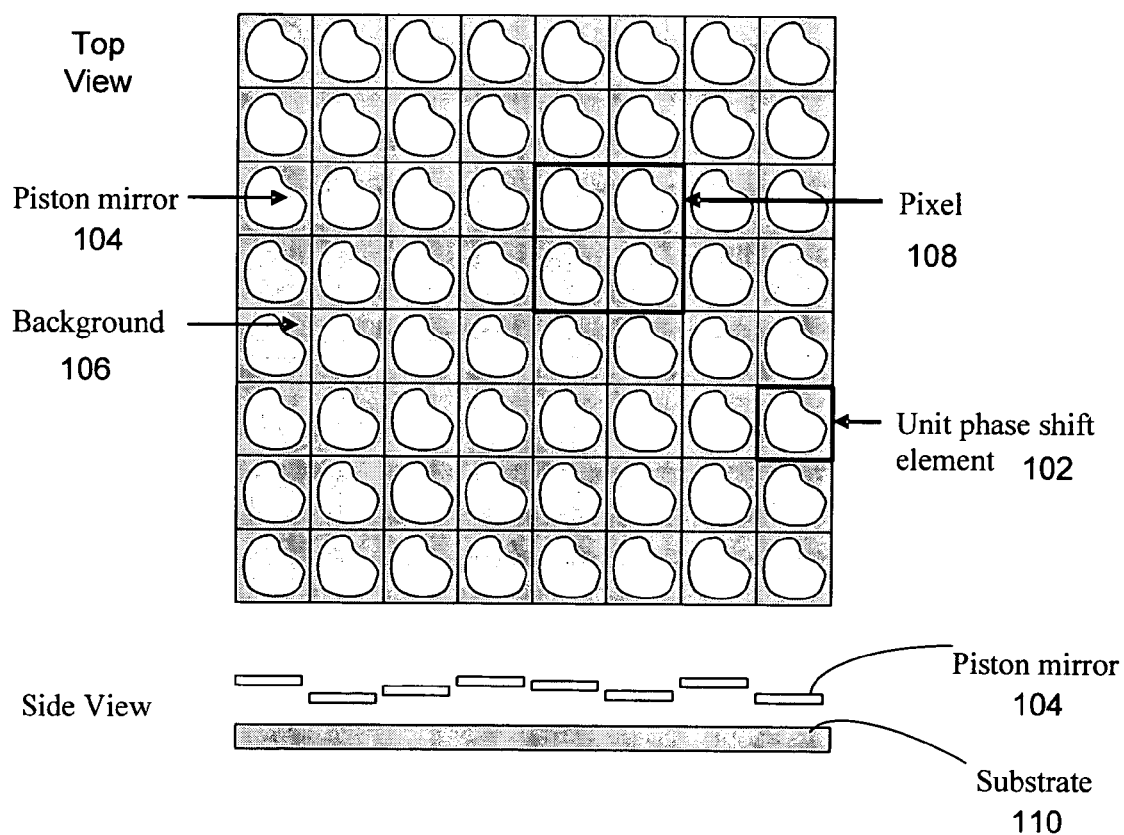
FIG. 1 includes a planar top view and a side view of a generic Complex Spatial Light Modulator (CSLM) according to an embodiment of the present invention.

Spatial light modulators are increasingly being developed for use in various applications, including display systems, holographic display systems, optical information processing and data storage, printing, and maskless lithography. However, for these and many other applications requiring high or very high resolution, such as leading edge semiconductor processing, spatial light modulators having both magnitude and phase modulation would be preferred. In the semiconductor industry, phase-shift mask (PSM), and its extension such as alternating PSM and attenuated PSM, has been known as a powerful resolution enhancement technique. Here the conventional (magnitude) mask is superimposed with phase-shift elements, usually a transparent material with thickness that provides a π (180 degree) phase retardation at designated locations. Unintended constructive interference between adjoining light and dark pixels, or lighter and darker pixels, can cause blurring of boundaries between pixels and a loss of detail in the resultant image. While this may be acceptable or unnoticeable for certain applications, such as displays, it is not acceptable for other applications, such as photolithography for manufacturing semiconductor devices, in which images having features of microns or less must be produced with great precision. Accordingly, there is a need for a spatial light modulator capable of independently modulating both magnitude and phase of light incident thereon.

There is a further need for a spatial light modulator that modulates the light intensity in an analog gray scale and independently also the phase in an analog gray scale manner. These features may be used for further resolution enhancement and other purposes, but they are only applied in a very limited manner in conventional lithography; for example only two values of phase shifts (0 and π) are practically implemented.

In addition, it is desirable for the spatial light modulator to have the following characteristics: a large étendue, a high number of pixel count, high modulation speed, high power handling capability in a wide spectral range of the light, and high dynamic range.

The present disclosure is directed to a novel spatial light modulator (SLM) which may be referred to as a Complex Spatial Light Modulator (Complex SLM or CSLM) and a method of continuously and independently modulating both the phase and magnitude of light incident thereon.

A Complex SLM comprises a SLM that is configured to simultaneously modulating both the magnitude and phase of light incident thereon, i.e. to modulate the complex amplitude of the light field. Applications for which a Complex SLM according to the present invention is particularly useful include high speed, high resolution applications such as: maskless lithography for fabricating semiconductor devices and Integrated Circuits (ICs), holographic display modulators, and similar applications.

A Complex SLM and operation thereof will now be described with reference to the figures of the present application. For purposes of clarity, many of the details of SLMs in general and diffractive SLMs in particular that are widely known and are not particularly relevant to the present invention have been omitted from the following description.

In general, a Complex SLM according to an embodiment of the present invention comprises an array of a number of pixels, each pixel with multiple phase shift elements. The Complex SLM may also be preferably equipped with imaging optics including a Fourier filter adapted to resolve each pixel, but not the individual phase shift elements and other sub-pixel features. In accordance with an embodiment of the invention, the Complex SLM may be configured and controlled so as to be functionally equivalent to a spatial light modulator that simultaneously modulates the magnitude and phase of light, i.e. that modulates the complex amplitude of the light field.

In one embodiment, shown in FIG. 1, each of the phase shift elements include an electrostatically movable mirror 104 supported above and oriented to reflect light away from a negligible area or substantially non-reflective background 106. In one example, the movable mirror 104 comprises a piston mirror, and the background 106 may comprise a substantially non-reflective surface of a substrate 110. An arbitrary shape of the mirror 104 is shown in FIG. 1, as the mirror 104 may be implemented in various shapes (square, circular, etc.). Preferably, each pixel 108 consists of an m×n unit cell, where m≧2 and/or n≧2. In the example illustrated in FIG. 1, the pixel 108 comprises a 2×2 unit cell.

Applicants have determined that a Complex SLM having an array of piston mirrors, such as shown in FIG. 1, can simultaneously and continuously modulate both the magnitude and phase of the light field. The principals of operation and performance of Complex SLMs according to certain preferred embodiments of the present invention will now be described in detail.

Concept

Figure 2:
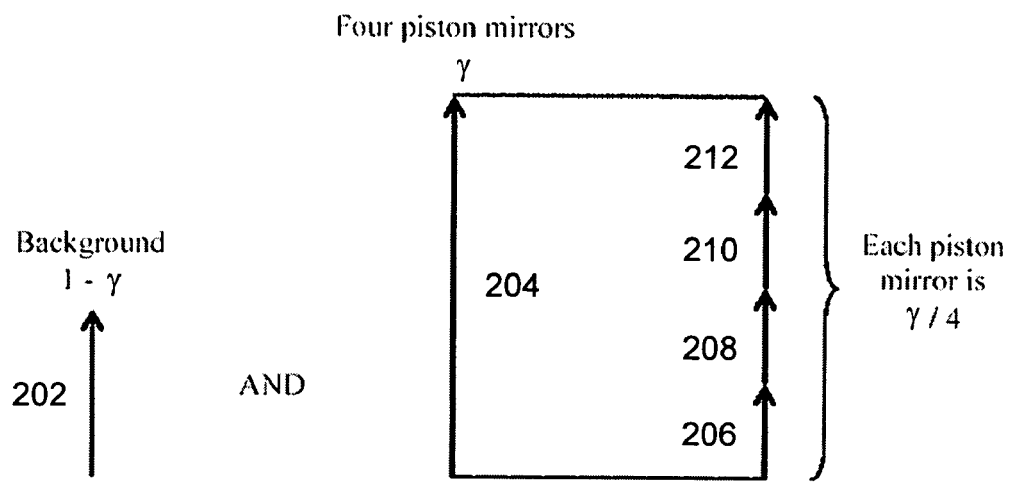
FIG. 2 depicts phasor diagrams of the light field contributed by the background, and of the light field contributed by the phase shifting elements or mirrors according to an embodiment of the present invention.

Starting with a simple case in which there are 2×2 cells per pixel, and three output states: 0, 1, and −1. Note that $-1 = 1e^{i\pi}$. As shown in FIG. 2, in accordance with an embodiment of the invention, the $0^{th}$-order normalized electric field contribution from the piston mirrors in a pixel is $0.5 < \gamma \leq 1$, while by controlling the areas and/or electric field reflectivity that from the background is $1-\gamma$.

FIG. 2 are phasor diagrams of the $0^{th}$-order light field contributed by the background and each of the four phase shifting elements or mirrors according to an embodiment of the present. Of course, other implementations may have a different number of phase shifting elements per pixel. As shown, the $0^{th}$-order light field 202 from the background has a magnitude of $1-\gamma$. The four phase shifting elements each contribute a $0^{th}$-order light field having a magnitude of $\gamma/4$ (206, 208, 210 and 212). As shown in FIG. 2, when the light field contributions from each of the four elements have a same phase, then the combined light field contribution 204 from the four elements together has a magnitude of γ.

Figure 3:
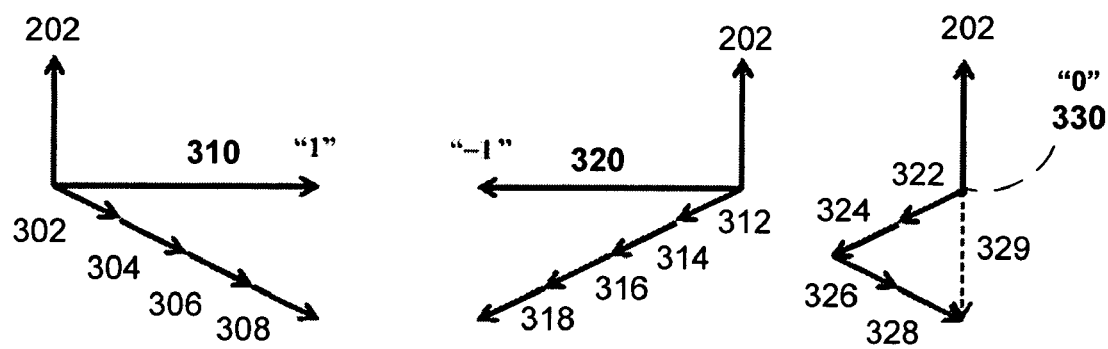
FIG. 3 depicts phasor diagrams of the light field contributed by the background, the mirrors, and the resultant light field showing three $0^{th}$-order outputs in reflecting with 0 phase ("1"), reflecting with $\pi$ phase ("−1") and non-reflecting ("0") states according to another embodiment of the present invention.

FIG. 3 shows three example $0^{th}$-order output states which can be created by appropriate deflection of the mirrors in a pixel according to an embodiment of the invention. The three phasor diagrams in FIG. 3 each show the light field contributed by the background, the phase shifting elements or mirrors, and the resultant light field for one output state. The three output states include two reflecting (1, −1) states and one non-reflecting (0) state. The background contribution 202 is the same in each of the three states, and is shown in FIG. 3 as having a phase shift of +π/2.

The phasor diagram on the left corresponds to the "1" reflecting state. In this state, the contributions from the four phase shifting elements (302, 304, 306, and 308) are such that the resultant light field 310 (after combining with the background contribution 202) has a zero phase shift. Note that, in this case, each of the reflective elements is positioned (by way of a piston or other means) so as to provide a contribution with a same phase (so that the four contributions line up as shown).

The phasor diagram in the middle corresponds to the "−1" reflecting state. In this state, the contributions from the four phase shifting elements (312, 314, 316, and 318) are such that the resultant light field 320 (after combining with the background contribution 202) has a phase shift of π. Again, in this case, each of the reflective elements is positioned (by way of a piston or other means) so as to provide a contribution with a same phase (so that the four contributions line up as shown).

The phasor diagram on the right corresponds to the "0" non-reflecting state. In this state, the contributions from the four phase shifting elements (322, 324, 326, and 328) combine to a complex vector 329 of equal magnitude and opposite phase as the background contribution 202. Hence, the resultant light field 330 has a zero magnitude.

Generalization

A Complex SLM having m×n individual phase shift elements (for example, electrostatically displaceable mirrors, such as piston mirrors) per pixel, m≧2 and/or n≧2 will now be considered. However, for simplicity of the illustration, without loss of generality, the special case of m=n=2 will be discussed.

In some embodiments, circuitry is configured to independently control the deflection of each individual phase shift element. In other embodiments, circuitry may be configured to drive two or more of the individual phase shift elements together with a same voltage drive signal (in effect, electrically "ganging" or grouping the elements together). For example, to drive the displacements corresponding to the phasor diagram on the right side of FIG. 3, the mirrors associated with the phasors 322 and 324 may be electrically "ganged" together, and the mirrors associated with the phasors 326 and 328 may be electrically "ganged" together.

Figure 4:
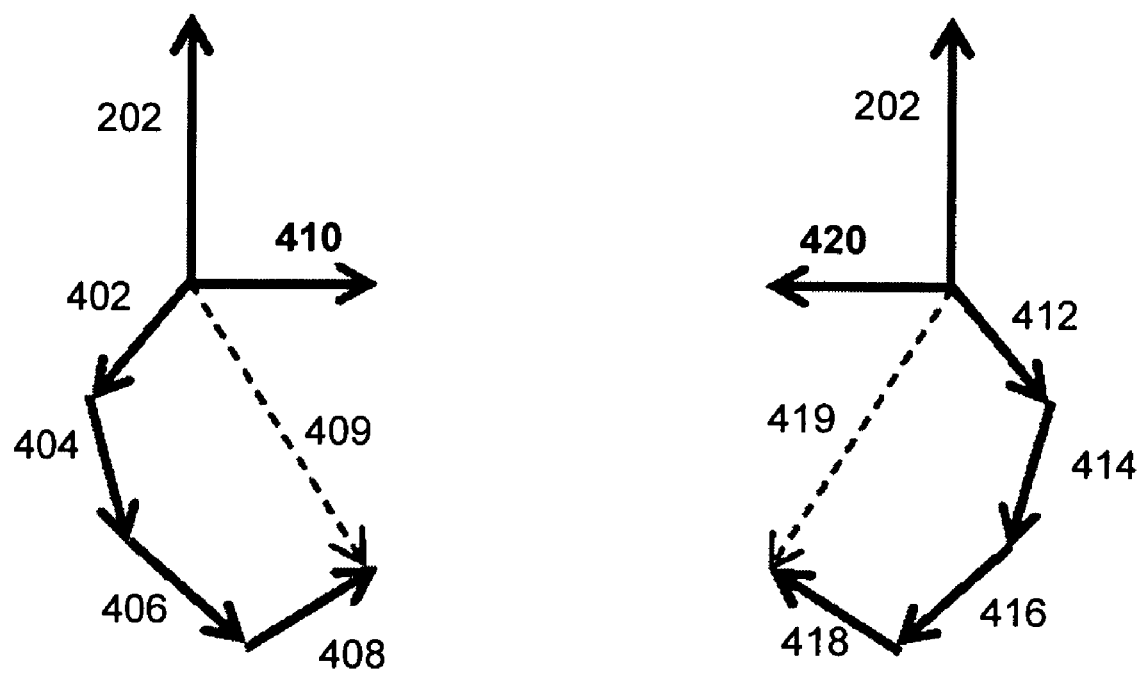
FIG. 4 depicts phasor diagrams of the light field contributed by the background, the mirrors, and the resultant $0^{th}$-order light field showing two outputs with the same gray level output states but phase shifted by 0 or $\pi$ according to an embodiment of the present invention.

Referring to FIG. 4, one specific solution for a single pixel with each of the mirrors positioned or operated in a specified way so as to produce a gray level magnitude with 0 or π phase shift is shown in FIG. 4. Other specific solutions are possible by using a Complex SLM in accordance with an embodiment of the invention.

In the state shown on the left side of FIG. 4, the contributions from the four phase shifting elements (402, 404, 406, and 408) add together to create a combined complex vector 409. Each of the reflective elements is positioned (by way of a piston or other means) so as to provide a contribution with a different phase. The combined vector 409 is such that the resultant light field 410 (after adding together with the background contribution 202) has a zero phase shift. Note, however, that the magnitude of the resultant light field 410 in this phasor diagram is smaller than in the phasor diagram on the left side of FIG. 3. In this way, a gray level with zero phase shift is achieved.

In the state shown on the right side of FIG. 4, the contributions from the four phase shifting elements (412, 414, 416, and 418) add together to create a combined vector 419. Each of the reflective elements is positioned (by way of a piston or other means) so as to provide a contribution with a different phase. The combined vector 419 is such that the resultant light field 420 (after adding together with the background contribution 202) has a phase shift of π. Note, however, that the magnitude of the resultant light field 420 is smaller than in the phasor diagram in the middle of FIG. 3. In this way, a gray level with phase shift of π is achieved.

Figure 5:
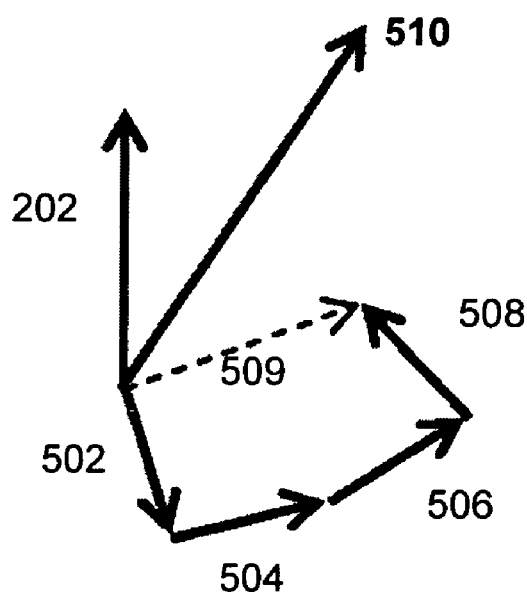
FIG. 5 depicts a phasor diagram of the light field contributed by the background, the mirrors, and the resultant $0^{th}$-order light field for a pixel in a gray level output state phase shifted by a value other than 0 or $\pi$ according to another embodiment of the present invention.

Referring to FIG. 5, another gray level state is illustrated. In the state shown in FIG. 5, the contributions from the four phase shifting elements (502, 504, 506, and 508) add together to create a combined vector 509. Each of the reflective elements is positioned (by way of a piston or other means) so as to provide a contribution with a different phase. The combined vector 509 is such that the resultant light field 510 (after adding together with the background contribution 202) has a magnitude and a phase shift with gray levels, but of limited range.

Note that the realizations of the states shown in FIGS. 4 and 5 are not unique—many piston mirror configurations corresponds to the same output state. This degree of freedom may be advantageously exploited in accordance with an embodiment of the invention.

Figure 6:
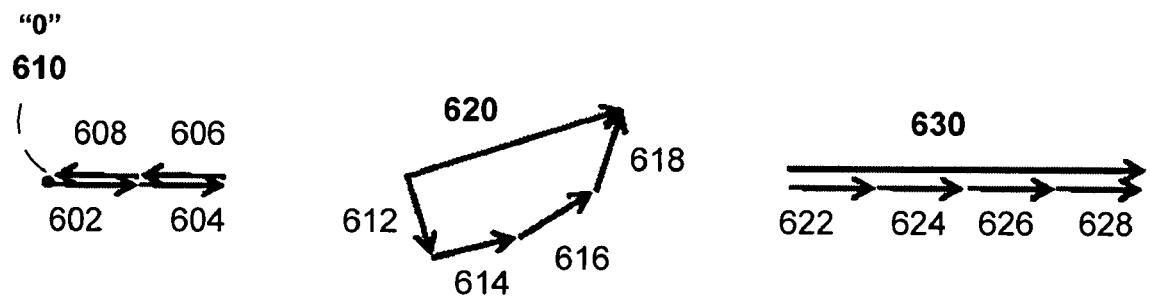
FIG. 6 depicts three phasor diagrams of the light field contributed by the mirrors and the resultant $0^{th}$-order light field from a Complex SLM in which the background is made totally non-reflecting or the mirrors have 100% fill-factor according to other embodiments of the present invention.
Figure 7:
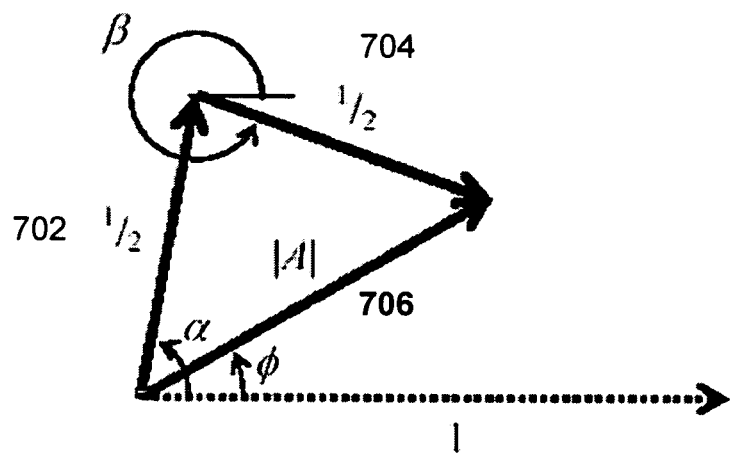
FIG. 7 depicts a normalized phasor diagram of the complex amplitude for the light field from a Complex SLM in which there are an even number of mirrors per pixel according to an embodiment of the present invention.

A general complex amplitude modulator, that is a Complex SLM operated to produce a gray level but with arbitrary phase, will now be considered with reference to FIGS. 6 and 7.

Referring to the phasor diagrams of FIG. 6, if all the stationary parts are made totally non-reflecting or if the piston-mirrors are adapted to have a 100% fill-factor (described below), then the array becomes a truly complex amplitude modulator. In other words, the background contribution has zero magnitude. In this case, all magnitudes from "0" to a "maximum" and all phases (modulo 2π) are then reachable.

The state shown on the left side of FIG. 6 corresponds to a "0" non-reflecting state. In this state, the contributions from the four phase shifting elements (602, 604, 606, and 608) cancel each other out so that the resultant light field 610 has a zero magnitude.

The state shown in the middle of FIG. 6 corresponds to a reflecting state with an intermediate magnitude (between zero and the maximum) and an intermediate phase (between zero and 2π). In this state, the four phase shifting elements are positioned such that their contributions (612, 614, 616, and 618) add together to provide the resultant light field 620. The resultant light field 620 has a specific (controllable) intermediate magnitude and a specific (controllable) phase.

The state shown on the right side of FIG. 6 corresponds to a reflecting state with a maximum magnitude. In this state, the four phase shifting elements are positioned so as to reflect light with a same (controllable) phase such that their contributions (622, 624, 626, and 628) add together maximally. The resultant light field 630 has a maximum magnitude. By controlling the position of the elements, the phase of the resultant light field 630 may be controlled.

An arbitrarily normalized complex amplitude can be expressed as A=|A| exp(iφ), where 0≦|A|≦1 and 0≦φ≦2π. The phasor configuration for this complex amplitude is not unique, but can be advantageously standardized. FIG. 7 shows one possible standard phasor configuration for the case where there is an even number of piston mirrors per pixel. In this example, half of the piston mirrors may be deflected equally by αλ/4π (where λ is the wavelength of the light) to produce a phase-shift α, and the other half by βλ/4π to give a phase-shift β. The magnitudes of both halves may be considered to be ½. As shown in FIG. 7, the complex amplitudes of the two halves (702 and 704) combine together to produce a resultant light field 706 as follows.

$$A\angle\phi = 1/2\angle\alpha + 1/2\angle\beta$$

Hence, the two piston mirror phase deflections that produce magnitude $0 \leq |A| \leq 1$ and phase-shift $0 \leq \phi \leq 2\pi$ can be calculated to be $$\alpha = \phi + \cos^{-1}|A|$$

$$\beta = \phi - \cos^{-1}|A|$$

As can be seen from the above equations, two address lines per pixel are sufficient to produce an arbitrary magnitude and phase (i.e. two degrees of freedom per pixel).

Efficiency

Figure 8:
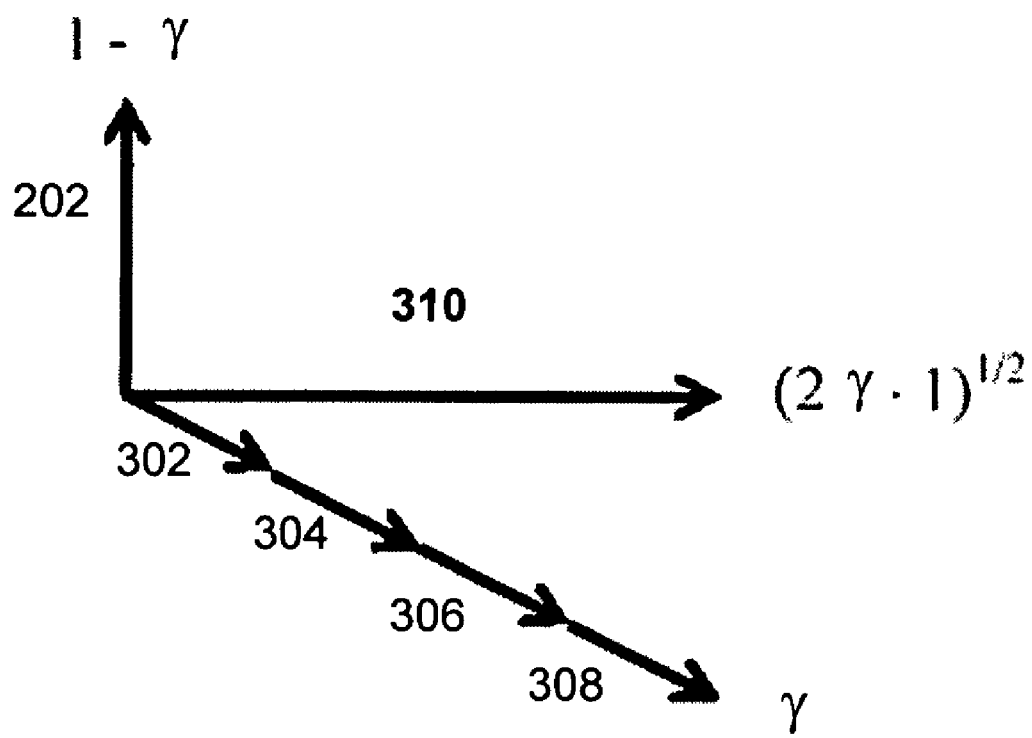
FIG. 8 depicts a phasor diagram of the light field contributed by the background, the mirrors, and the resultant $0^{th}$-order light field for a Complex SLM according to an embodiment of the present invention.

The optical efficiency of a Complex SLM made and operated in accordance with an embodiment of the present invention will now be discussed with reference to FIG. 8. FIG. 8 is a phasor diagram of the light field contributed by the background, the mirrors, and the resultant light field for a pixel in a $0^{th}$ order output state for a Complex SLM. In this "1" state, like the state shown in the left side of FIG. 3, the contributions from the four phase shifting elements (302, 304, 306, and 308) are such that, after combining with the background contribution 202, the resultant light field 310 has a zero phase shift.

The efficiency of a Complex SLM in the "1" state, shown for example in FIG. 8, is $2\gamma - 1 \leq 1$. Note that $0.5 < \gamma \leq 1$. Therefore, it is desirable to have γ as large as possible so as to advantageously increase the efficiency.

Figure 9:
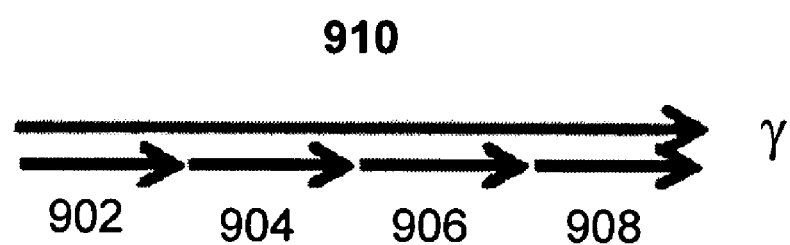
FIG. 9 depicts a phasor diagram of the light field contributed by the background, the mirrors, and the resultant $0^{th}$-order light field for a Complex SLM in which the background is substantially non-reflecting or the mirrors have 100% fill-factor according to an embodiment of the present invention.

A phasor diagram for an embodiment with no contribution from the background is shown in FIG. 9. In this state, the four phase shifting elements are positioned such that their contributions (902, 904, 906, and 908) add together maximally with zero phase shift. The resultant light field 910 has a magnitude of γ.

Referring to FIG. 9, because the stationary part (i.e. the background) is totally non-reflecting, the efficiency of the "1" state becomes $\gamma^2$, which is higher than or equal to the above $2\gamma - 1$ (again, note that $0.5 < \gamma \leq 1$).

A device with 100% fill piston mirror and 100% reflectivity will be the most efficient.

Contrast

Because $n \geq 2$ (and $m \geq 2$) in accordance with an embodiment of the invention, the pixel spatial frequency is lower than the unit cell spatial frequency and may be advantageously discriminated by Fourier filtering to produce a high contrast image, as demonstrated in simulations shown and described in more detail below. To achieve high contrast, it is preferred to have the phase shift elements diffract the light with the highest possible grating frequency (that is, the most alternating arrangement possible). In a preferred embodiment, the Fourier filter is adapted to resolve each pixel but not the individual phase shift element in each pixel. The Fourier filter may include, for example, an aperture. More preferably, the Fourier filter includes an apodized aperture to substantially reduce, if not eliminate, the occurrence of ripples in the resultant image.

Exemplary Embodiments

Figure 10A:
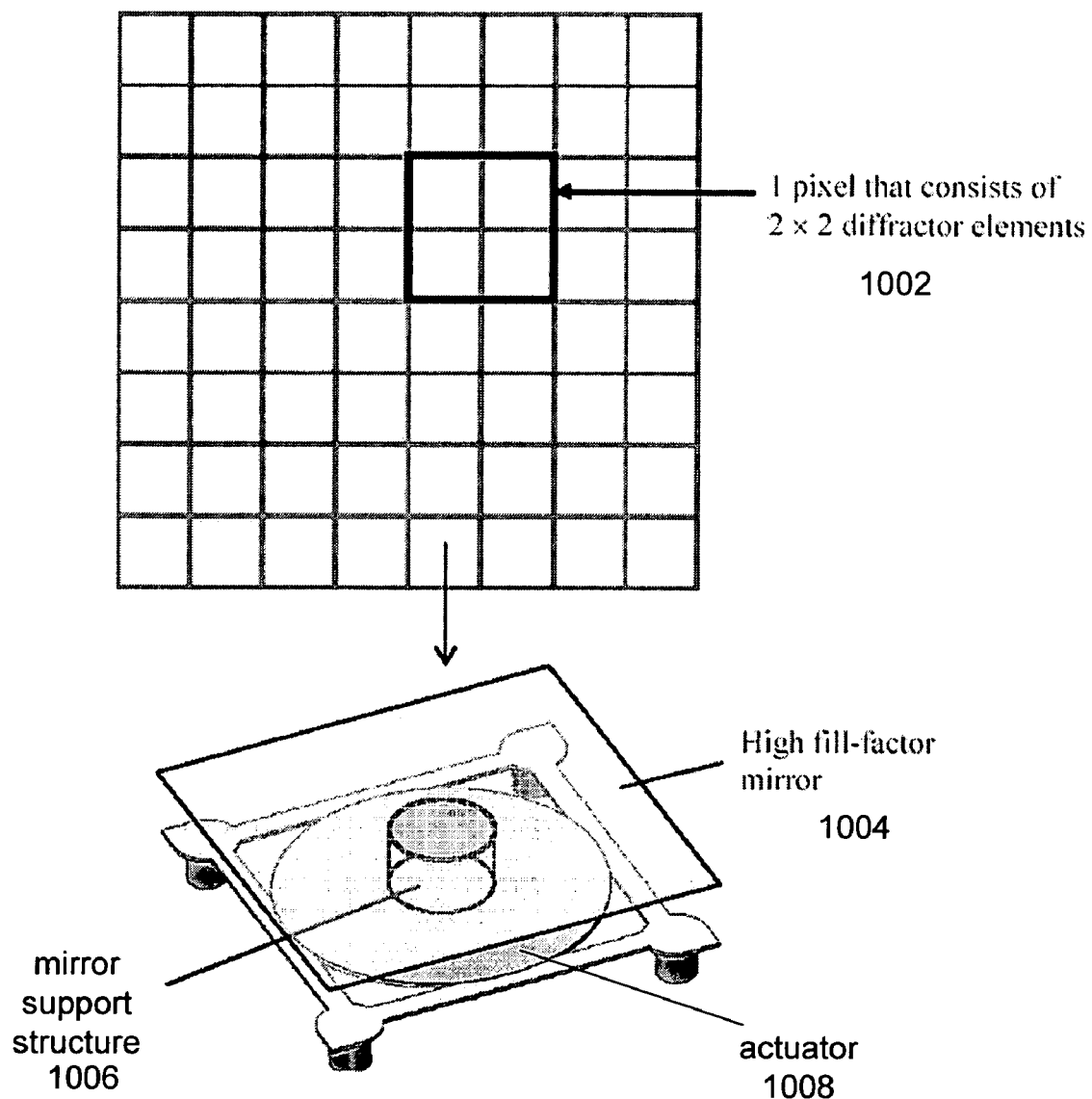
FIG. 10A depicts a planar top view of a Complex SLM with a 100% (or nearly 100%) fill-factor mirror array, and also depicts a detailed perspective view of a single phase shift element of the Complex SLM with a high fill factor mirror and a support structure according to an embodiment of the present invention.

Certain exemplary embodiments of a Complex SLM according to the present invention will now be described in greater detail with reference to FIGS. 10A and 10B. FIG. 10A depicts a planar view top of a complex SLM having a 100% (or nearly 100%) fill-factor mirror array and also depicts a detailed perspective view of a single phase shift element or cell thereof.

Referring to FIG. 10A, the Complex SLM generally includes a film or membrane disposed above an upper surface of a substrate (the substrate is not shown in these figures) with a number of displaceable or movable portions or actuators 1008 formed therein. Supported above and affixed to each actuator by a mirror support structure 1006 is a mirror 1004 having a light reflective surface that is positioned generally parallel to the upper surface of the substrate and oriented to reflect light incident on a top surface of the Complex SLM. Each of the actuators 1008 and its associated mirror 1004 may form an individual phase shift element.

Individual actuators 1008 or groups of actuators are moved up or down over a very small distance (typically only a fraction of the wavelength of light) relative to the substrate by electrostatic forces controlled by drive electrodes in the substrate underlying the actuator membrane. Preferably, the actuators 1008 can be displaced by n×λ/2 wavelength, where λ is a particular wavelength of light incident on the complex SLM, and n is an integer equal to or greater than 0. Moving the actuators 1008 brings reflected light from the planar light reflective surface 1004 of one phase shift element into constructive or destructive interference with light reflected by adjoining phase shift elements in a pixel 1002, thereby modulating light incident on the Complex SLM.

The complex SLM can include any number of phase shift elements arranged and operated to form pixels 1002 of any configuration or size. As noted above, a pixel 1002 is made up of one or several actuators.

In general, each actuator in a pixel 1002 is connected to an electrode and is independently displaceable. In practice, the actuators may be grouped into several groups, and each group may be operating under the same (ganged) electrode.

Generally, the complex SLM can include two or more pixels each having two or more phase shift elements per pixel. Thus, both a maximum size of the complex SLM and the pixels therein are constrained only by the size of a substrate on which it is fabricated. In certain preferred embodiments, shown in FIGS. 1 and 10, each individual pixel includes a square 2×2 array of phase shift elements. However it will be apparent to those skilled in the art that the complex SLM can include any number of pixels having any number of phase shift elements arranged in any configuration including square, triangular, hexagonal and circular.

Figure 10B:
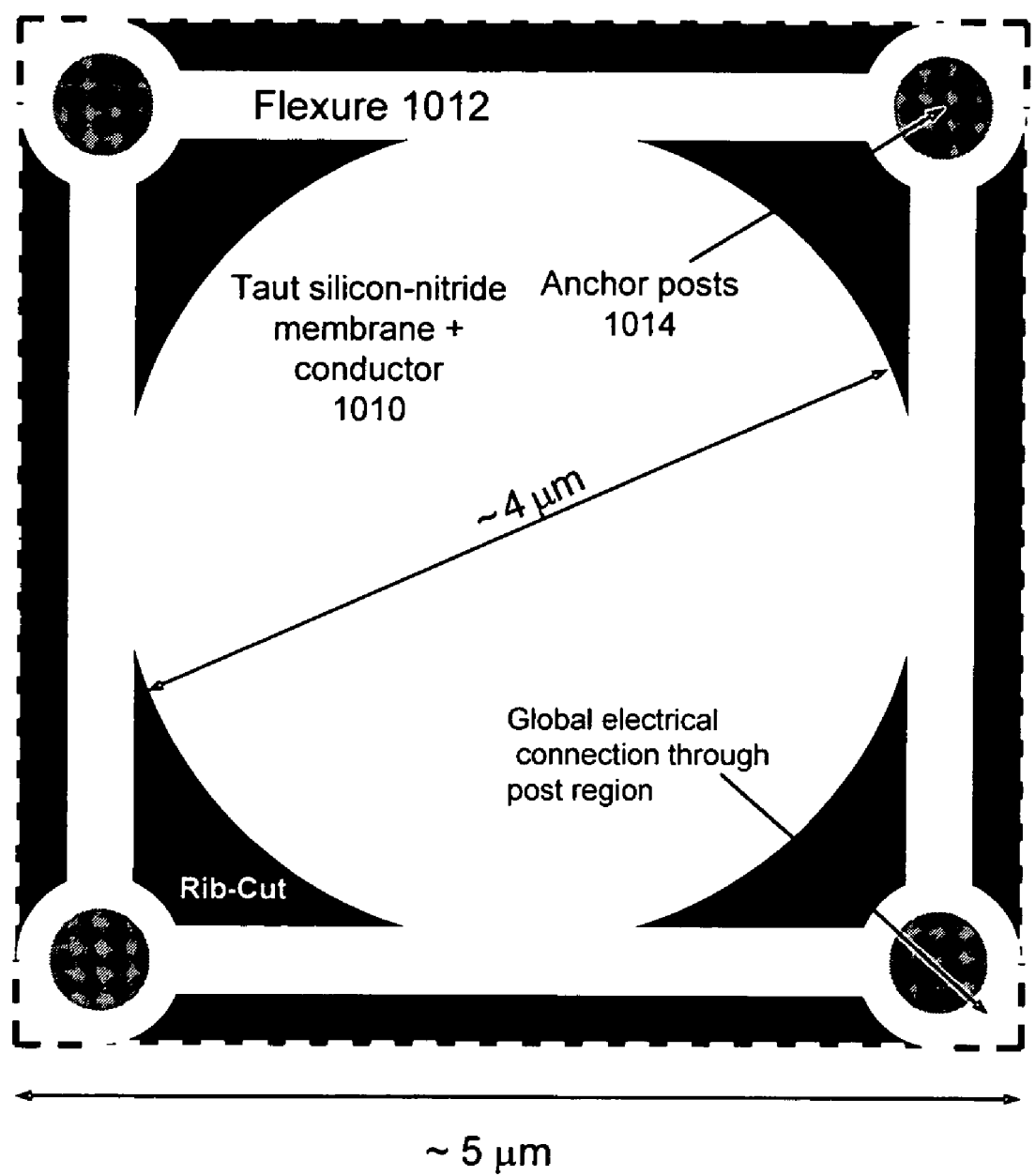
FIG. 10B is a top view diagram of a single actuator according to an embodiment of the present invention.

The underlying structures of the complex SLM, such as the actuator membrane, will now be described in greater detail with reference to the perspective view of the single phase shift element in the bottom portion of FIG. 10A and with reference to the top view of a single actuator 1008 as shown in FIG. 10B. It is to be understood that the embodiment shown in FIGS. 10A and 10B, and the specific dimensions given therein, are exemplary only, and the complex SLM of the present invention is not limited to this particular embodiment and dimension shown. In this embodiment, the actuator membrane (see membrane 1010) is anchored or posted (see flexure 1012 and anchor posts 1014) to the underlying substrate at the corner of each actuator 1008. The tent membrane is sparsely or lightly posted to the substrate at the extremities of the illustrated array.

Referring to FIG. 10B, the actuator membrane, and the actuators 1008 formed therein, include a taut silicon-nitride (SiN) layer, and an electrically conductive film or layer (i.e., titanium-nitride TiN). The conductive layer is electrically coupled to electrical ground in the substrate through one or more of the posts 1014, such that a voltage applied to the drive electrode (not shown in this figure) through an integrated drive cell or channel in the substrate deflects actuators toward or away from the substrate. Generally, a single conductor from the drive channel branches into mini-electrodes or drive-electrodes underneath each individual actuator in a single pixel.

In order to provide stable operating condition, the distance, h, between the actuator and substrate is larger than 3× the maximum displacement, i.e., h>3λ/2, for example preferably h is 2λ.

Preferably, the design of the actuator membrane is carefully engineered such that the mirrors remain parallel to one another and to the surface of the substrate as they are displaced. The following design features facilitate this:

(1) The actuator disks are suspended by narrow flexures 1012, which sustain most of the deformation as they assume a parabolic shape under electrostatic deflection.

(2) The actuator disks 1010 are connected to the flexure 1012 only at their centers, and as far away from the anchor posts 1014 as possible. As the actuators deflect, the centers of the flexures, and therefore the mirrors supported thereon, remain parallel to the substrate.

(3) The actuator disk 1010 is minimally connected to the flexure 1012 only at the attachment points. Thus, little deformation is mechanically transmitted from the flexure 1012 to the actuator disk 1010 or the mirror supported thereon.

(4) Optionally, if additional stiffness is required, other high modulus films, such as oxides, could be patterned onto the actuator disk 1010 and not on the flexures 1012.

Generally, the mirrors comprise a TiN layer with a surface coated with reflective material, such as aluminum. More preferably, the design of the mirror is also carefully engineered such that the mirrors remain substantially flat and co-planar with the substrate, especially as they are deflected. Design features that facilitate this include proper selection of film thickness and use stress engineering techniques and/or layer(s) of stiffener oxides, in addition to an Aluminized TiN layer. Optionally, the mirror can further be stiffened by use of topography or features, such as corrugations or dimples. Preferably, the corrugations or dimples are formed in the mirror away from the reflective surface.

In the embodiment shown in FIG. 10A the Complex SLM includes a 100% or nearly 100% fill-factor mirror array in which the peripheral edges of each mirror abuts peripheral edges of adjoining mirrors such that substantially none of the light incident on the complex SLM passes between the mirrors to impinge on the underlying actuators, flexures or posts. It will be appreciated that this embodiment provides the highest optical efficiency.

Specifications for an exemplary High Fill Factor complex SLM according to this embodiment are as follows:

| | |
|---|---|
| Number of pixels: | 2500 × 2500 (with 2 × 2 phase shift elements/pixel) |
| Pixel dimension: | 10 μm × 10 μm (with 5 μm × 5 μm phase-shift elements) |
| Mirror deflection: | 0 to λ/2 |
| Intensity modulation: | 0 to maximum, analog |
| Phase modulation: | 0 to 2π, analog |
| Contrast: | 1000:1 |
| Speed: | >1 MHz |
| Optical efficiency: | >50% |

Figure 16:
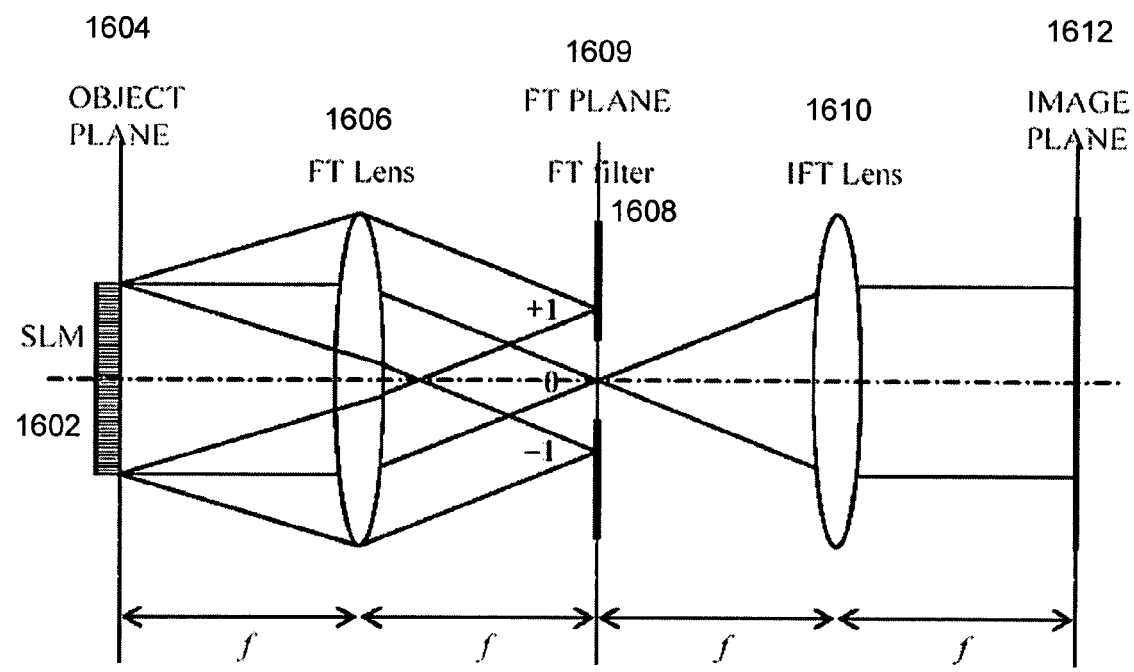
FIG. 16 depicts a Fourier transform (FT) filter configuration in accordance with an embodiment of the invention.

FIG. 16 depicts a Fourier transform (FT) filter configuration in accordance with an embodiment of the invention. The FT filter configuration may be used to control the imaging system to resolve light reflected from each pixel but not light reflected from each phase shift element in each pixel in a spatial light modulator (SLM) 1602. The configuration may include the SLM 1602 in an object plane 1604, a Fourier transform (FT) lens 1606, a Fourier transform (FT) filter 1608 in a Fourier transform (FT) plane, an inverse Fourier transform (IFT) lens 1610, and an image plane 1612.

The FT lens 1606 maps light from the SLM 1602 to its transform, and the IFT lens 1610 maps the light from the transform to an image (which is a filtered image of the light from the SLM 1602, but upside-down) in the image plane 1612. The spatial frequency spectrum of the light from the SLM 1602 is formed at the FT plane 1609.

FT or spatial filtering may be done by placing an amplitude and/or phase filter 1608 at the FT plane 1609. In one embodiment, the FT filter 1608 may comprise an aperture with suitable apodization that transmits the $0^{th}$-order of light and blocks the ±1 and all higher orders of light.

To create a bright pixel on the image, the corresponding SLM pixel is set in the mirror state. The incoming illumination will be passed undiffracted, i.e. as the $0^{th}$-order, through the central aperture of the FT filter 1608 and transmitted maximally to the image plane 1612. To create a dark pixel on the image, the corresponding SLM pixel is set in the maximally diffracting state. The incoming illumination will be diffracted maximally as ±1 and higher orders, which are blocked by the non-transmitting portion of the FT filter 1608. Intermediate diffraction can be used to create gray levels.

Simulated Performance

Imaging performance of the Complex SLM according an embodiment of the present invention will now be described with reference to FIGS. 11–15.

Figure 11:
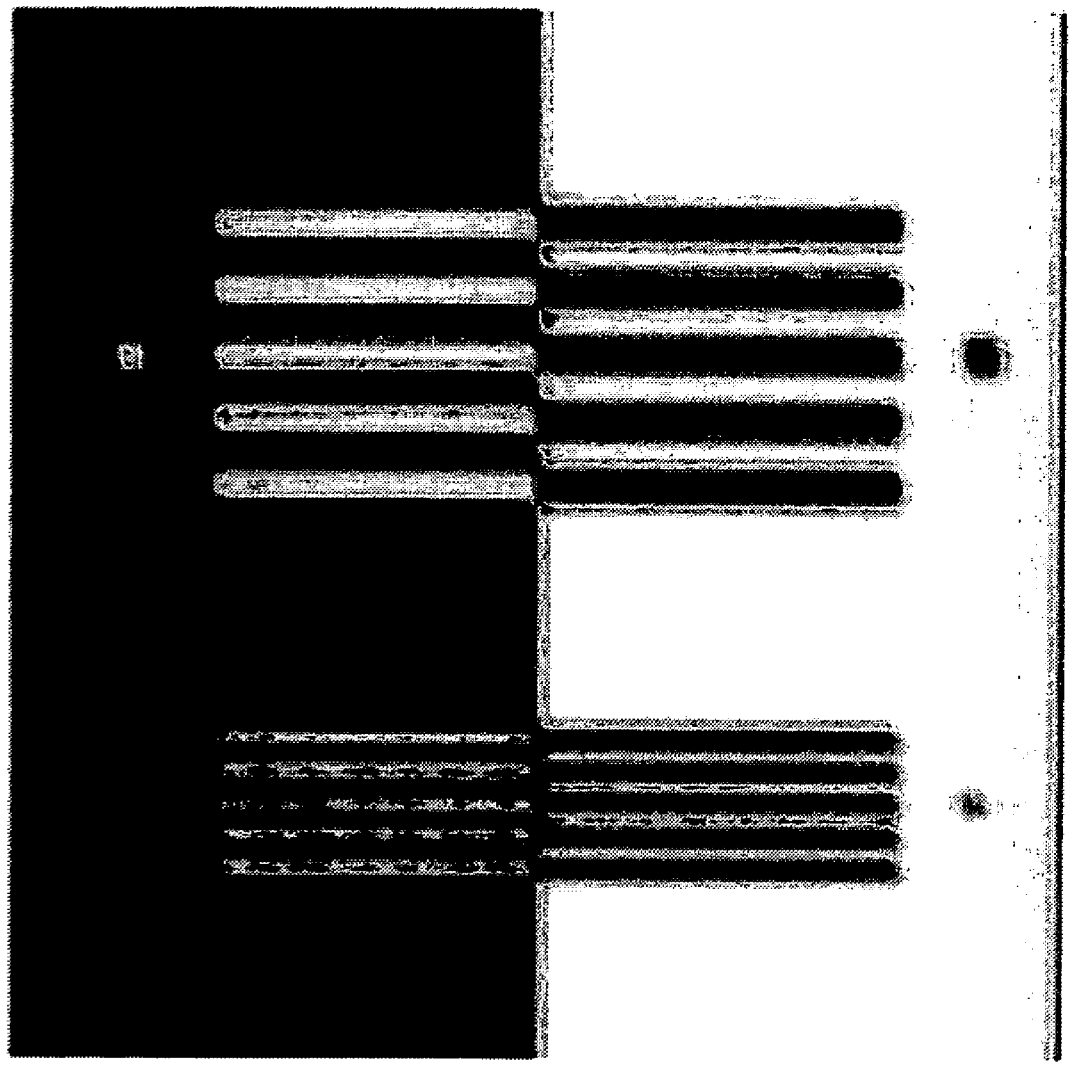
FIG. 11 depicts a pattern generated by 100% fill-factor mirror array according to an embodiment of the present invention showing that the Complex SLM can be operated as an intensity modulating SLM.

FIG. 11 illustrates a simple binary phase pattern generated using a complex SLM according to an embodiment of the present invention. The pattern shown in FIG. 11 is generated by a 100% (or nearly 100%) fill-factor piston-mirror array (2×2 mirrors/pixel). An Apodized Fourier filter is used. FIG. 11 demonstrates that a complex SLM according to an embodiment of the invention configured in a pure phase modulation mode may operate as an intensity spatial light modulator. This mode has some similarities with chromeless phase mask lithography in the lithography art.

Figure 12:
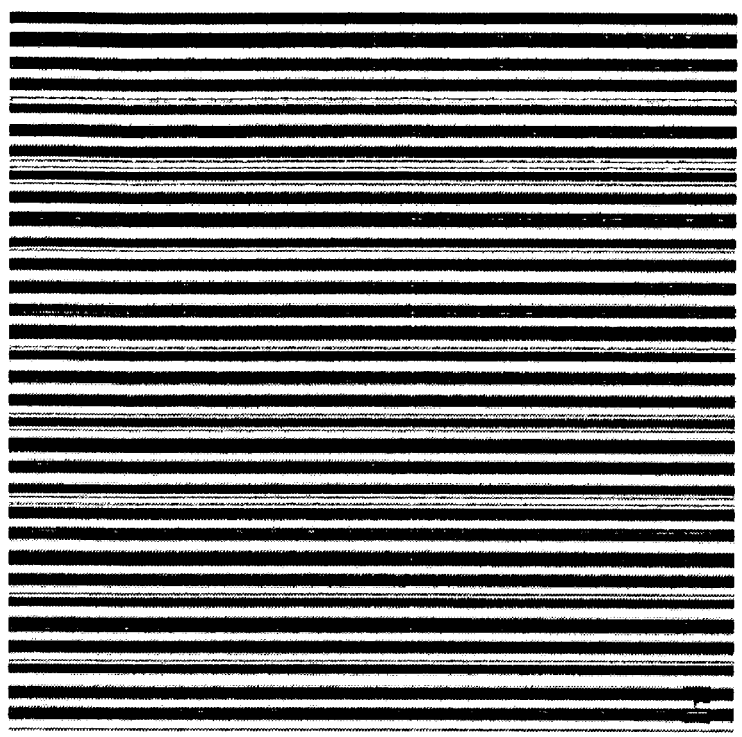
FIG. 12 depicts patterns (i.e. simple binary line gratings) generated by (a) a SLM modulating only magnitude of light, and (b) a Complex SLM modulating light magnitude and phase according to an embodiment of the present invention.
Figure 12:
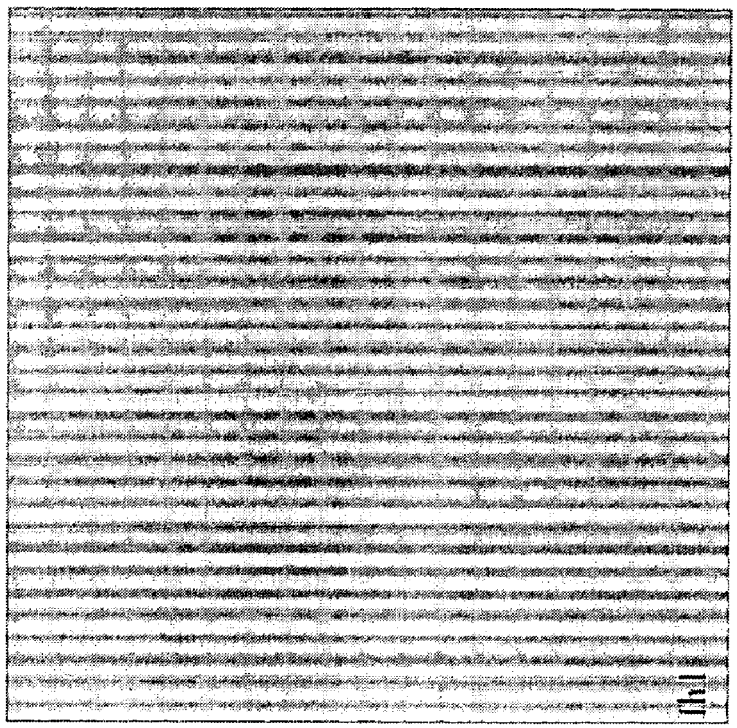

FIG. 12 illustrates the performance of the Complex SLM with "phase-shift mask" (PSM) in generating a line grating. Intensity and phase modulation may be performed simultaneously with a complex SLM operating in accordance with an embodiment of the invention. The bright/dark lines in FIG. 12(*a*) are produced by pixels that have the same phase (i.e. this is a simple binary line grating), while the bright/dark lines in FIG. 12(*b*) have alternating 0 and π phases (analogous to an alternating PSM). The advantageous higher contrast of the latter is evident.

Figure 13:
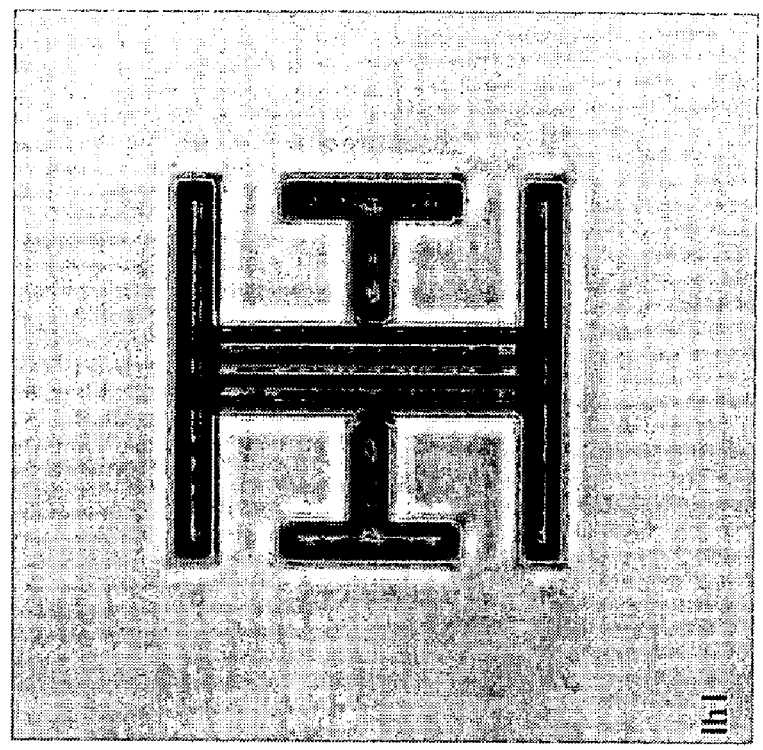
FIG. 13 depicts patterns (i.e. closed-loop patterns) generated by (a) a SLM modulating only magnitude of light, and (b) a Complex SLM modulating light and phase according an embodiment of the present invention.
Figure 13:
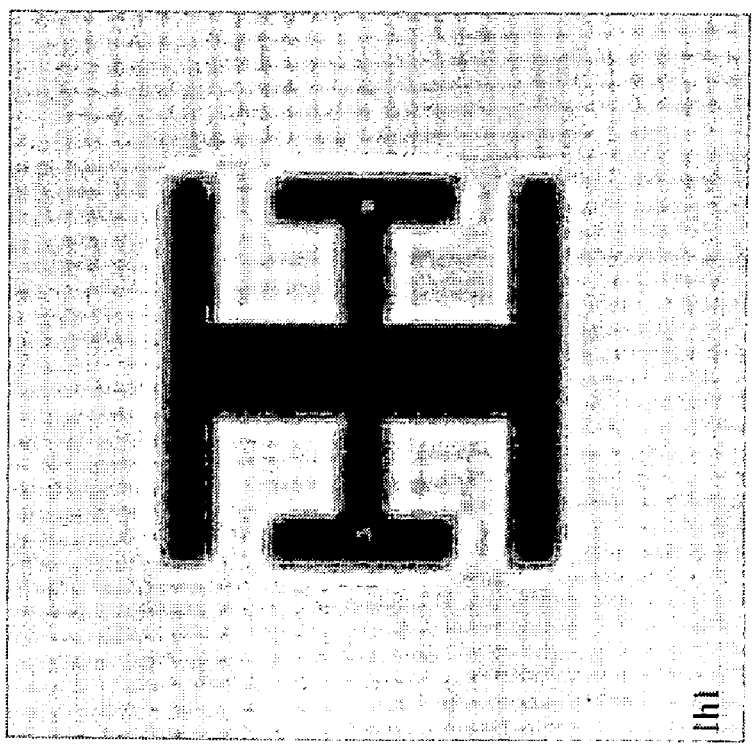

An example of improved resolution is shown in FIG. 13 in accordance with an embodiment of the invention. Here, the pattern being resolved has a "compatible phase-shift requirement." The interior and the exterior of the closed-loop patterns have the same phase in FIG. 13(*a*). In contrast, in accordance with an embodiment of the invention, the interior of the closed-loop patterns in FIG. 13(*b*) are π phase-shifted with respect to the exterior. Clearly, the interior lines in FIG. 13(*b*) are better resolved.

Figure 14:
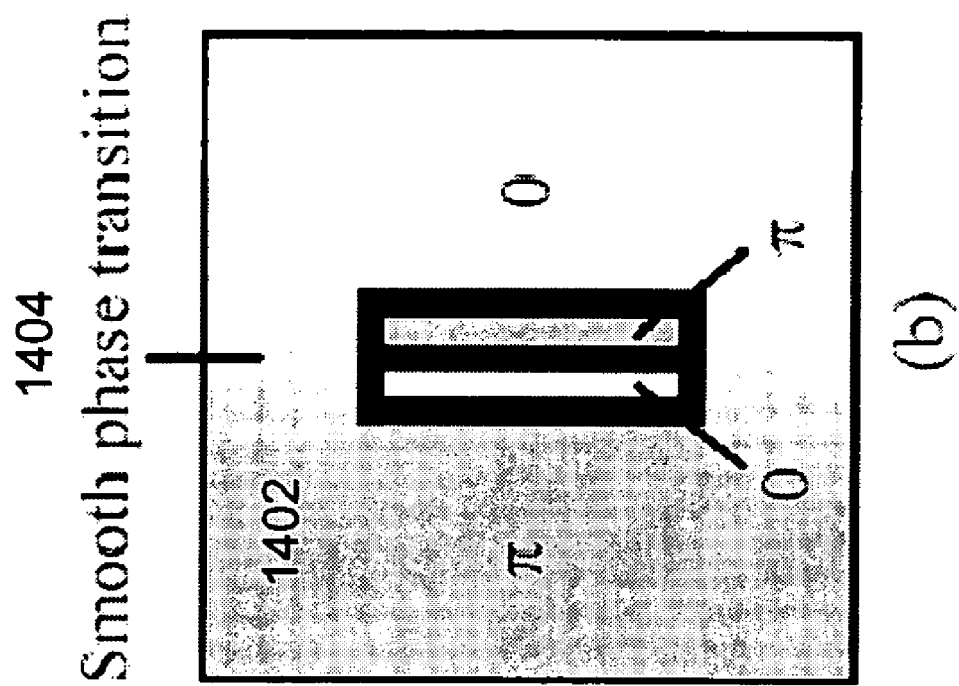
FIG. 14 illustrates (a) a problem due to conflicting phase shift requirement and (b) a solution thereof in accordance with an embodiment of the invention.
Figure 14:
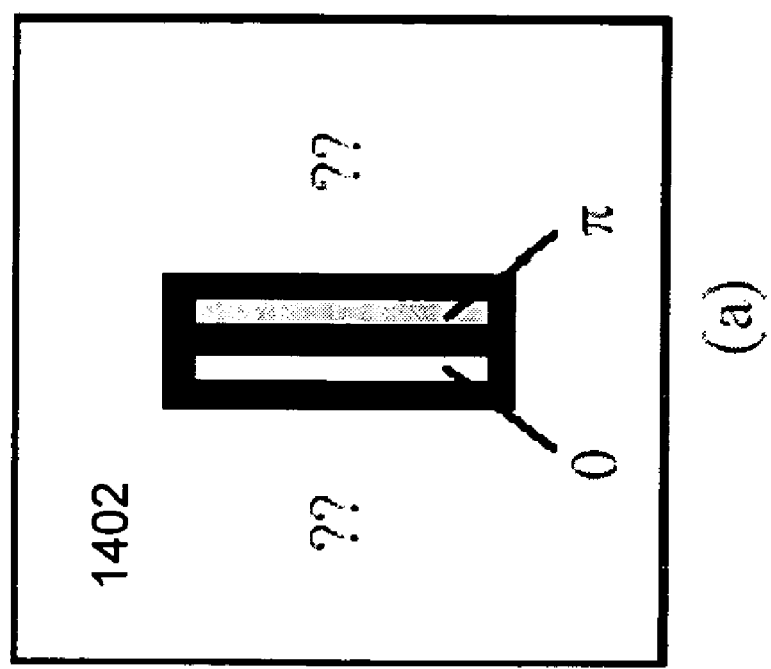

Another example of improved resolution is shown in FIG. 14 in accordance with an embodiment of the invention. Here, the pattern being resolved has a "conflicting phase-shift requirement." FIG. 14(a) illustrates the problem, and FIG. 14(b) the solution. Referring to FIGS. 14(a) and 14(b), alternating 0 and π phase-shift may be applied to the interior of the center feature. However, this poses a conflicting phase-shift requirement to the exterior area 1402—the question marks in FIG. 14(a) indicate the problem of what phase to assign to the exterior area 1402. Applicants have determined that simply assigning π to the left half and 0 to the right half of the exterior area will cause undesirable diffraction at the 0–π boundary. To prevent diffraction, applicants have found that softening the transition by employing a phase ramp 1404 in the exterior area 1402, as shown in FIG. 14(b) will reduce the diffraction effect. This analog phase transition 1404 cannot be practically done in conventional PSM (which employs 0 and π only), but it may be readily achieved by a complex SLM in accordance with an embodiment of the invention.

Figure 15:
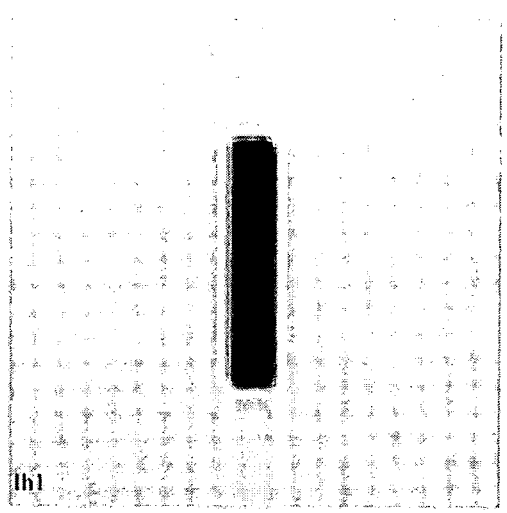
FIG. 15 depicts patterns generated (a) without Phase Shift Modulation (PSM), (b) with alternating PSM in the interior and 0 phase in the exterior, (c) with alternating PSM in the interior and π phase in the left exterior and 0 phase in the right exterior, and (d) with alternating PSM in the interior and a smooth phase transition in the exterior in accordance with an embodiment of the invention.
Figure 15:
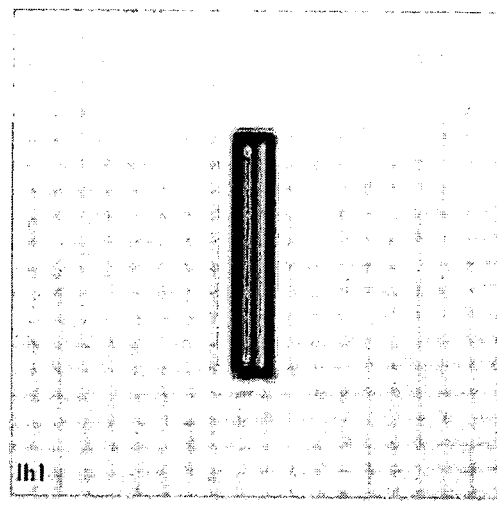
Figure 15:
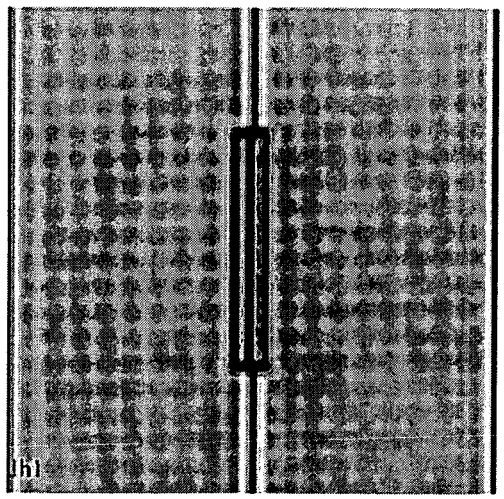
Figure 15:
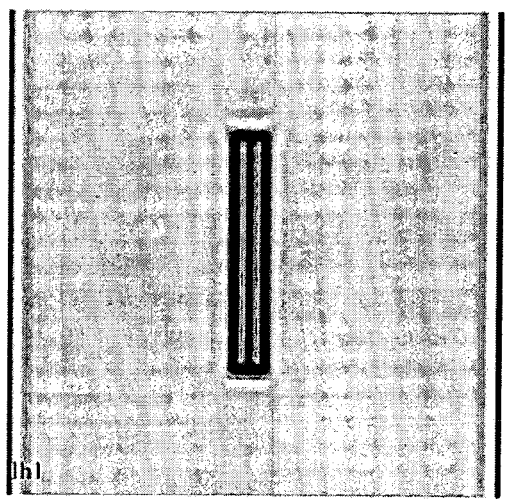

FIG. 15 depicts a "conflicting phase-shift requirement" pattern as generated by a Complex SLM in various operating modes. Specifically, FIG. 15(a) is the pattern without PSM. FIG. 15(b) is the pattern with alternating PSM in interior (0 phase in the left interior and π phase in the right interior), but with 0 phase in the exterior. Notice that the left interior is only marginally resolved. FIG. 15(c) is the pattern with π phase in the left exterior and 0 phase in the right exterior. Strong diffraction is seen as occurring at the 0–π boundary. In accordance with an embodiment of the invention, the best result is shown in FIG. 15(d), obtained with smooth phase transition (in eight equal steps of π/8) as explained above in relation to FIG. 14(b).

The above discussed results demonstrate advantages of the Complex SLM over conventional PSM.

One aspect of the present invention relates to a Complex SLM for modulating light incident thereon. Generally, the SLM has a number of pixels, each pixel including a plurality of phase shift elements disposed above a substrate, and a Fourier transform filter adapted to control the imaging system to resolve each pixel but not the individual phase shift element in each pixel. The pixels and the phase shift elements are adapted such that although not all light incident on the SLM is reflected, substantially all light reflected from the SLM comes from the phase shift elements.

Preferably, the phase shift elements are electrostatically displaceable mirrors, and the SLM further includes means for applying an electrostatic force between the substrate and the electrostatically displaceable mirrors to independently deflect each mirror relative to the substrate. More preferably, the means for applying an electrostatic force and the mirrors are adapted to enable each mirror to be deflected by a distance of about n·λ/2, where λ is a particular wavelength of light incident on the SLM, and n is an integer equal to or greater than 1. It should be noted, that in reflective operation, every λ/2 deflection corresponds to a 2π phase shift. The mirrors are adapted such that the interference of the light fields from the displaceable mirrors in a pixel create a net light field that has a magnitude anywhere between a minimum (usually near zero) and a maximum values, and has a phase anywhere between 0 and n·2π. For example, assuming there are even number of mirrors in a pixel, a maximum magnitude at 0 phase corresponds to all mirrors in a pixel undeflected, a minimum magnitude is obtained from deflecting half of the mirrors in a pixel by π/4 and the other half undeflected, an intermediate magnitude and phase by deflecting half of the mirrors in a pixel by one value and the other half by another value.

In one embodiment, each of the phase shift elements include a movable actuator flexibly supported above an upper surface of a substrate by a number of posts extending from the upper surface of the substrate and by a number of flexures extending from a peripheral edge of the movable actuator to at least one of the number of posts. Each of the electrostatically displaceable mirrors further include a support affixed to the top surface of the actuators, and a mirror surface supported by the support above the actuators, flexures and posts. The mirror surfaces are sized and shaped such that peripheral edges of each mirror surface abuts peripheral edges of adjoining mirror surfaces, whereby substantially none of the light incident on the SLM passes between the mirror surfaces to impinge on and/or be reflected by the actuators, flexures or posts.

Another aspect of the present invention relates to a method of modulating both phase and magnitude of light incident on the SLM described above. Generally, the method includes the steps of: (i) causing the light to impinge upon the plurality of phase shift elements such that substantially all of the light reflected from the SLM is reflected by the phase shift elements; and (ii) filtering the reflected light using a Fourier transform filter adapted to resolve each pixel but not the individual phase shift element in each pixel.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A spatial light modulator (SLM) for modulating light incident thereon, the spatial light modulator comprising:
   a plurality of pixels, each pixel including a plurality of phase shift elements; and
   a Fourier transform filter adapted to control the imaging system to resolve light reflected from each pixel but not light reflected from each phase shift element in each pixel,
   wherein the plurality of pixels are controlled to independently modulate phase and magnitude of light reflected therefrom.

2. The SLM according to claim 1, wherein the plurality of phase shift elements are configured such that substantially all light reflected from the SLM comes from the phase shift elements.

3. The SLM according to claim 1, further comprising:
   a substrate having an upper surface, wherein the plurality of phase shift elements are disposed above the upper surface of the substrate,
   a plurality of electrostatically displaceable mirrors, where each phase shift element comprises at least one said mirror; and
   circuitry for applying voltages causing electrostatic forces between the substrate and the plurality of electrostatically displaceable mirrors to deflect each electrostatically displaceable mirror relative to the upper surface of the substrate.

4. The SLM according to claim 3, wherein the circuitry is configured to independently control the deflection of each electrostatically displaceable mirror.

5. The SLM according to claim 4, wherein two or more of the electrostatically displaceable mirrors are electrically connected together.

6. The SLM according to claim 3, wherein the circuitry for applying the voltages to cause the electrostatic forces is controlled so that each of the plurality of electrostatic mirrors are deflectable in an analog range of distances.

7. The SLM according to claim 6, wherein the circuitry for applying the voltages to cause the electrostatic forces is controlled so that a gray scale is achieved in the magnitude of the light reflected by the pixels.

8. The SLM according to claim 3, wherein each of the plurality of electrostatically displaceable mirrors comprise a movable actuator disposed above the upper surface of the substrate, the movable actuator having affixed thereto at least one of said mirrors to reflect light incident on the SLM.

9. The SLM according to claim 8, wherein the movable actuator is flexibly supported above the upper surface of the substrate by a plurality of posts extending from the upper surface of the substrate and by a plurality of flexures extending from a peripheral edge of the movable actuator to at least one of the plurality of posts.

10. The SLM according to claim 9, wherein each of the electrostatically displaceable mirrors further comprise:

a support affixed to the top surface of the actuators;

a mirror surface supported by the support above the actuators, flexures and posts; and wherein peripheral edges of the mirror surface abuts peripheral edges of adjoining mirror surfaces such that substantially none of the light incident on the SLM passes between the mirror surfaces to impinge on the actuators, flexures or posts.

* * * * *